United States Patent
Castle et al.

(10) Patent No.: US 11,167,691 B1
(45) Date of Patent: Nov. 9, 2021

(54) VEHICLE UTILITY RAIL WITH INTEGRATED LIGHTS

(71) Applicants: Thomas Castle, Lapeer, MI (US); Enrique G. Peniche, Troy, MI (US); Julien G. Solomon, Farmington Hills, MI (US); Dorinel Neag, Commerce, MI (US); Alexandra R. Morford, Royal Oak, MI (US)

(72) Inventors: Thomas Castle, Lapeer, MI (US); Enrique G. Peniche, Troy, MI (US); Julien G. Solomon, Farmington Hills, MI (US); Dorinel Neag, Commerce, MI (US); Alexandra R. Morford, Royal Oak, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 17/117,218

(22) Filed: Dec. 10, 2020

(51) Int. Cl.
*B60Q 3/30* (2017.01)
*B62D 33/023* (2006.01)
*F21V 5/00* (2018.01)
*F21W 107/10* (2018.01)
*F21Y 103/10* (2016.01)

(52) U.S. Cl.
CPC ............ *B60Q 3/30* (2017.02); *B62D 33/023* (2013.01); *F21V 5/007* (2013.01); *F21W 2107/10* (2018.01); *F21Y 2103/10* (2016.08)

(58) Field of Classification Search
CPC .... B60Q 3/30; B60Q 3/50; B60Q 3/53; F21V 5/007; F21W 2107/10; F21Y 2103/10
USPC .................................. 362/485, 511, 540–549
See application file for complete search history.

(56) References Cited

U.S. PATENT DOCUMENTS

| | | | |
|---|---|---|---|
| 5,495,400 A | 2/1996 | Currie | |
| 5,584,521 A | 12/1996 | Hathaway et al. | |
| 6,238,068 B1 | 5/2001 | Farmer, Jr. | |
| 7,390,044 B2 | 6/2008 | Marquez | |
| 8,408,627 B2 | 4/2013 | Mann | |
| 9,150,152 B2 * | 10/2015 | Sura | B60Q 3/30 |
| 9,561,749 B2 | 2/2017 | Heaman et al. | |

* cited by examiner

*Primary Examiner* — Jason M Han
(74) *Attorney, Agent, or Firm* — Ralph E. Smith

(57) ABSTRACT

A utility rail for a vehicle, includes an inward surface with a utility void, an outward surface opposite to the inward surface, and a light void that is open to the exterior of the utility rail and that is separate from the utility void. A light is received in the light void and has an emitter from which light is emitted from the at least one light void to illuminate an area adjacent to the utility rail. The utility rail may be a one-piece metal extrusion and the light void may be a downward facing channel provided in the extruded rail.

20 Claims, 4 Drawing Sheets

VEHICLE UTILITY RAIL WITH INTEGRATED LIGHTS

FIELD

The present disclosure relates to a utility rail with integrated lights, such as may be included in a cargo area of a vehicle.

BACKGROUND

Some vehicles include cargo areas in which items may be placed during transport, for example, a pickup truck bed. The pickup truck bed may be defined in part by a movable tailgate at the rear of the vehicle. Some vehicles include a light adjacent to the tailgate, near the floor of the pickup truck bed. However, the light is often blocked by an item in the bed, such as a toolbox or storage compartment, or an item being transported in the truck. And even if not blocked, the light at the rear of the cargo area leaves much of the cargo area unlit.

SUMMARY

In at least some implementations, a utility rail for a vehicle, includes an inward surface with a utility void, an outward surface opposite to the inward surface, and a light void that is open to the exterior of the utility rail and that is separate from the utility void. A light is received in the light void and has an emitter from which light is emitted from the at least one light void to illuminate an area adjacent to the utility rail.

In at least some implementations, the light is recessed within the light void such that no part of the light extends outboard of an outer edge of the utility rail that defines the light void.

In at least some implementations, the light void is defined in part by a downward facing surface and the light is arranged in the light void to emit light downwardly, where downwardly means in the direction of gravity or within 45 degrees of the direction of gravity. In at least some implementations, the downward facing surface is defined in part by a lower edge of the inward surface and a lower edge of the outward surface, and at least one light void is provided between the inward surface and the outward surface.

In at least some implementations, the utility rail has a first end and a second end, and the inward surface extends between the first end and the second end, and the utility void extends along at least a majority of the longitudinal length of the inward surface between the first end and the second end.

In at least some implementations, the at least one utility void is a c-shaped channel, and the at least one light void is a c-shaped channel that is oriented in a different direction than is the utility void. The utility void may be oriented perpendicular or within 45 degrees of perpendicular to the light void.

In at least some implementations, multiple lights are electrically coupled together and are spaced apart along a length of the utility rail between a first end and a second end. In at least some implementations, an upper surface is provided between the inward surface and the outward surface, and the upper surface is opposite to the lower surface, and wherein multiple lights each include a lens having an outer surface that is closer to the upper surface than is a lower edge of the inward surface, where the lower edge of the inward surface defines part of the lower surface of the body. In at least some implementations, at least one of the multiple lights is connected to the utility rail by a fastener extending through the outward surface.

In at least some implementations, the utility rail has a first end and a second end, and the light void is defined in part by a downward facing surface, and the downward facing surface extends between the first end and the second end, and the light void extends along at least a majority of the longitudinal length of the downward facing surface between the first end and the second end.

In at least some implementations, the light void is below the utility void with respect to gravity. In at least some implementations, the light void is above the utility void with respect to gravity. In at least some implementations, the utility rail is formed in one-piece of a metal material.

In at least some implementations, a vehicle including a cargo area defined in part by a sidewall, includes a utility rail, a mount and a light. The utility rail has an inward surface, a utility void open through the inward surface, an outward surface opposite to the inward surface and arranged to face the sidewall, and a light void that is open to the exterior of the utility rail and that is separate from the utility void. The mount is connected to the outward surface and to the sidewall to couple the utility rail to the sidewall. The light is received in the light void and having an emitter from which light is emitted from the at least one light void.

In at least some implementations, the utility rail is formed in one-piece of a metal material and the utility void and light void are c-shaped channels. The utility void may be oriented perpendicular or within 45 degrees of perpendicular to the light void. In at least some implementations, the light void is formed in a downwardly facing surface of the utility rail, where downwardly means in the direction of gravity or within 45 degrees of the direction of gravity.

In at least some implementations, multiple lights are received in the light void and are electrically coupled together. In at least some implementations, the lights are recessed in the utility rail with an outer surface of the lights spaced inwardly from an outer surface of the utility rail that defines at least part of the light void.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
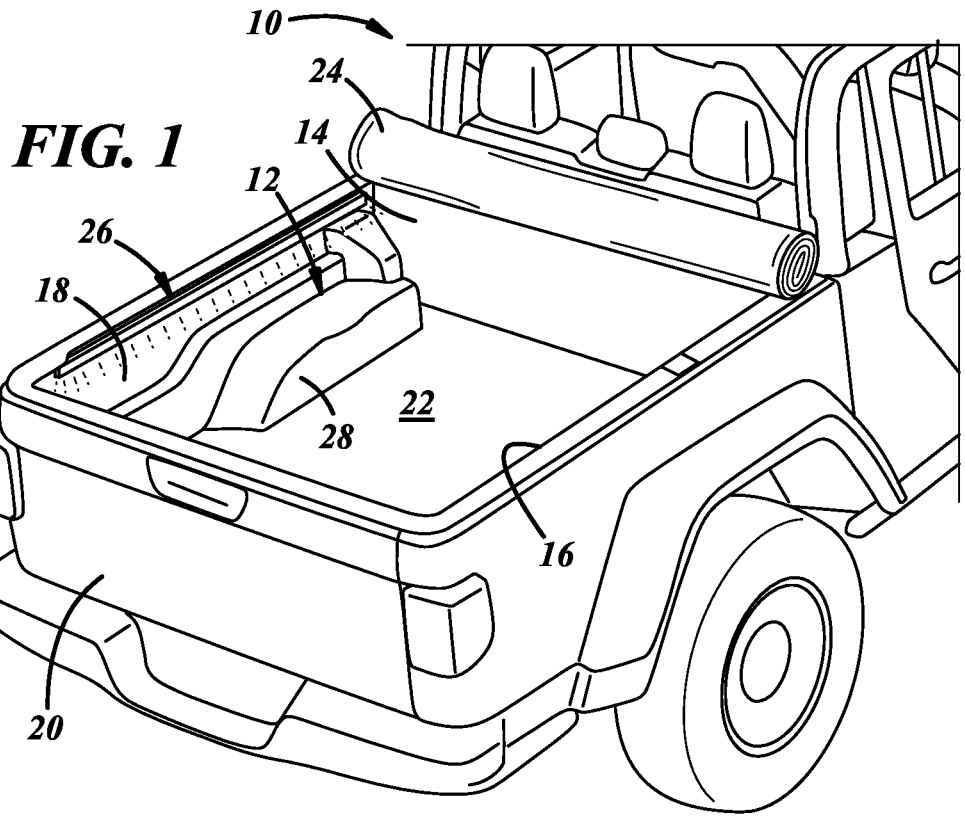
FIG. 1 is a perspective view of a cargo area of a truck, namely, a bed of a pickup truck, that includes a utility rail.

Referring in more detail to the drawings, FIG. 1 illustrates a portion of a vehicle 10 including a cargo area shown as a bed 12 of a pickup truck. The bed 12 may be defined between a front wall 14, opposite side walls 16, 18 extending from the front wall 14 to a rear that may be defined at least in part by a tailgate 20 that may be lowered and raised in a known manner. The walls 14, 16, 18 and 20 extend upwardly from a floor 22 and together the floor and walls define a generally rectangular cargo area 12 that may be open at the top or may be selectively closed by an upper wall or cover 24. To facilitate securing cargo within the cargo area 12, the vehicle 10 includes one or more utility rails 26 that are secured to one or more walls 14-20, typically spaced from the floor 22. In at least some implementations, utility rails 26 may be secured to the side walls 16, 18 and the front wall 14. In FIG. 1, the utility rail 26 is secured to a sidewall 16 above a wheel well 28 that protrudes into the cargo area 12. As noted, the vehicle 10 may include other utility rails 26, and they may be constructed the same as or similar to the utility rail 26 shown in FIG. 1 and for ease of description and understanding, only one utility rail 26 will be described in detail below.

Figure 2:
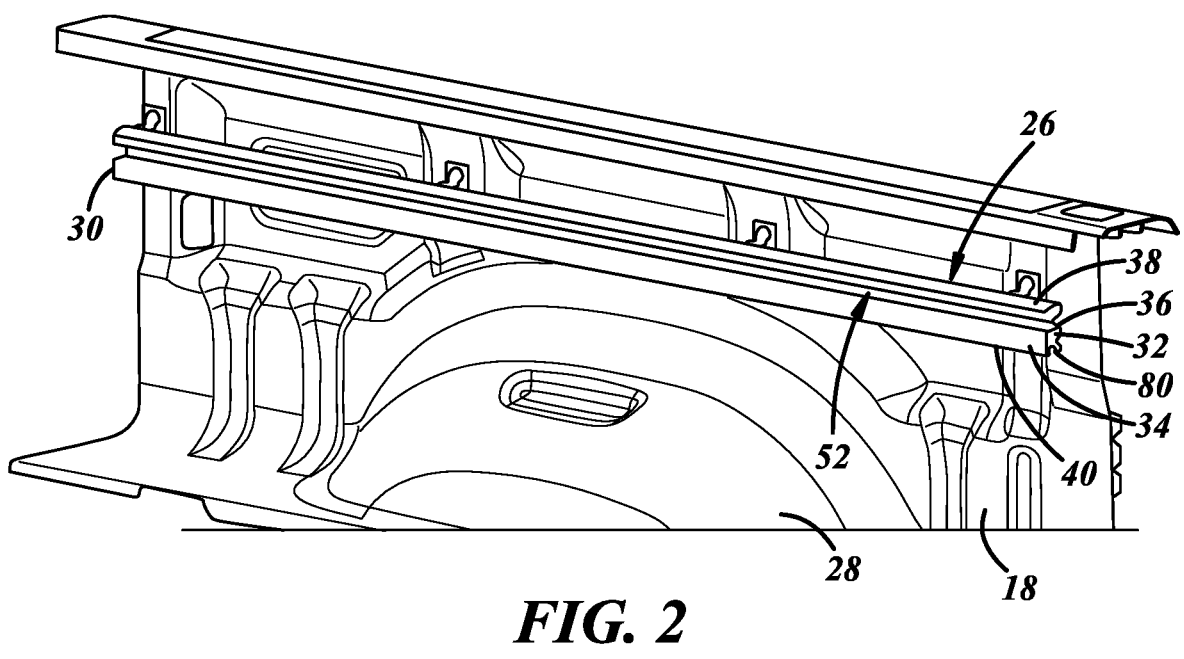
FIG. 2 is a perspective view of a sidewall of the pickup truck bed including the utility rail.

As shown in FIG. 2, the utility rail 26 has a first end 30, a second end 32, an inward surface 34 that extends between the first end 30 and the second end 32 and faces inwardly toward an interior of the cargo area 12, an outward surface 36 that faces toward the sidewall 18, an upper surface 38 that faces upwardly and a lower surface 40 that faces downwardly. Upwardly and downwardly, as used herein, are relative to the installed positions of the utility rail 26 and relative to the direction of gravity, sometimes herein referred as a vertical direction. The utility rail 26 includes one or more walls or flanges the exterior surface of which may define the inward surface 34, outward surface 36, upper surface 38 and lower surface 40. The utility rail 26 has a longitudinal length defined between the first end 30 and the second end 32, a lateral width between the inward surface 34 and outward surface 36, and a height between the upper surface 38 and lower surface 40 in the vertical direction. In at least some implementations, the utility rail 26 is formed from a single piece of metal that is extruded, and the various walls, flanges and surfaces discussed herein may thus extend longitudinally, along the length of the utility rail 26. Of course, the utility rail 26 may be formed in other ways, and may be defined by more than one piece of material, as desired.

Figure 3:
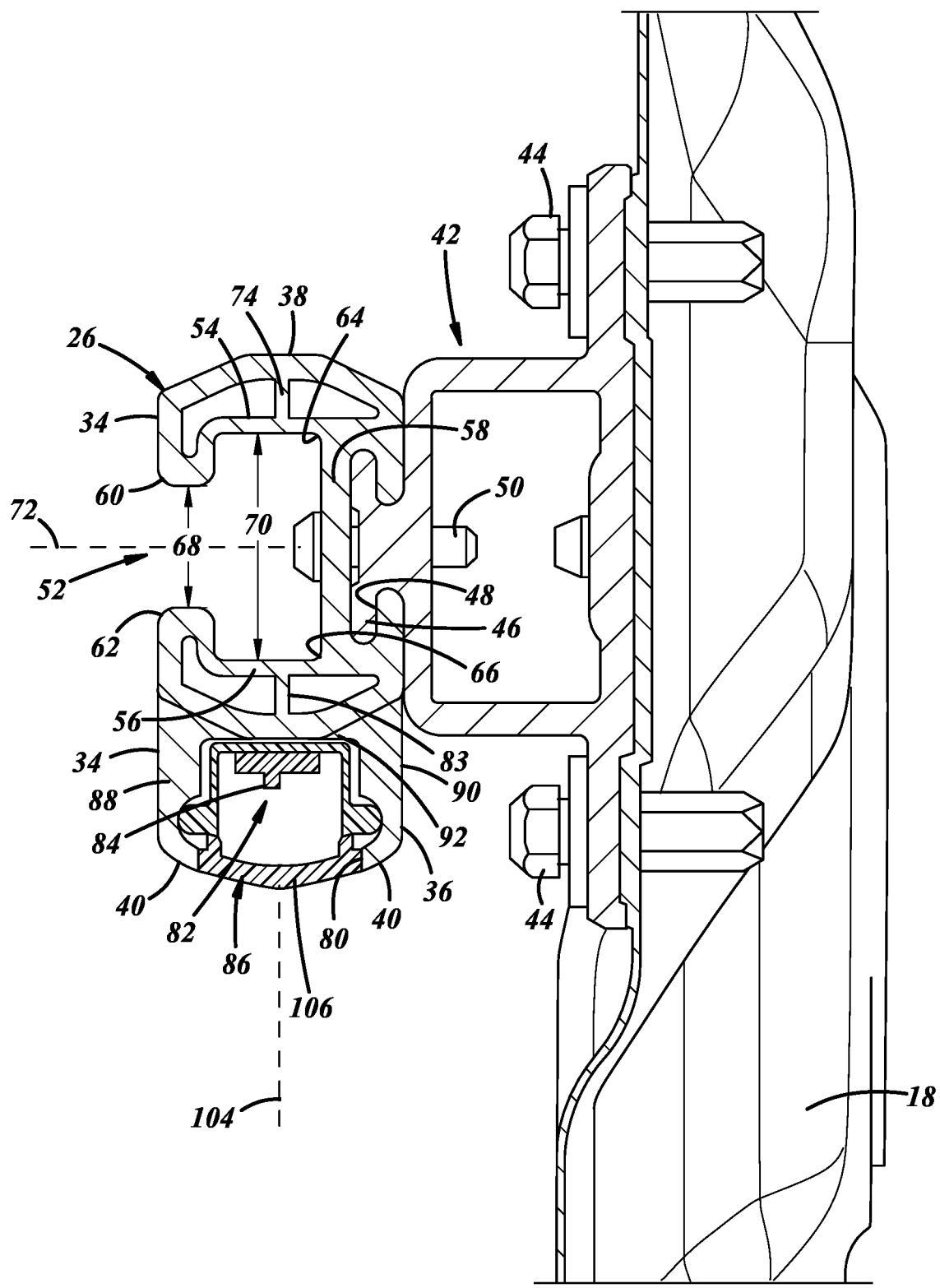
FIG. 3 is a cross-sectional view of the sidewall and utility rail.

A bracket or mount 42 may be connected to the utility rail 26 and to the sidewall 18 to secure the utility rail 26 within the cargo area 12 of the vehicle 10. As shown in FIG. 3, the mount 42 is secured to the sidewall 18 by multiple fasteners 44 and the mount 42 includes a T-shaped projection 46 that extends away from the sidewall 18. The utility rail 26, in turn, includes a C-shaped slot 48 that is open to the outward surface 36 and in which the projection 46 is received such that part of the projection 46 is overlapped by part of the utility rail 26 and the projection 46 is trapped in the slot 48. One or more fasteners 50 may connect the utility rail 26 to the mount 42 to prevent relative movement of the utility rail 26 relative to the mount 42 (e.g. sliding movement of the rail 26 along the projection 46). The mount 42 may extend along all or a significant portion (e.g. more than half) of the longitudinal length of the utility rail 26 or multiple discrete mounts may be provide along the length of the utility rail 26.

To facilitate securing items in the cargo area 12 to the vehicle 10, the utility rail 26 includes one or more utility voids 52. The utility void(s) 52 may receive a coupler, such as a tie down cleat or the like, to which a rope, chain or strap, for example, can be connected. In at least some implementations, the utility void 52 is an elongate channel that extends laterally through the inward surface 34. The channel may be defined at least in part by opposed surfaces of a first wall 54, a second wall 56 spaced from the first wall, and a base wall 58 extending between the first and second walls 54, 56. The first wall 54 and second wall 56 may extend from respective leading edges 60, 62 at the inward surface 34 to trailing edges 64, 66 at the base wall 58, and a gap 68 between the leading edges 60, 62 of the first wall 54 and second wall 56, respectively, communicates an interior of the utility void 52 with the cargo area 12.

So arranged, a tie down received at least partially within the utility void 52 may extend through the gap 68 or the tie down may be accessible within the rail 26 through the gap 68. To facilitate retaining the tie down within the utility void 52, the gap 68 between the leading edges 60, 62 of the first wall 54 and the second wall 56 is smaller than the gap 70 between at least a portion of the first wall 54 and second wall 56 between the leading edges 60, 62 and the base wall 58. In the example where the utility void 52 extends longitudinally, and the base wall 58 is laterally spaced from the inward surface 34, the gaps 66, 70 are measured vertically. In the example shown, the utility void 52 is C-shaped in cross-section (taken perpendicular to the longitudinal length), and the opening of the "C" extends through the inward surface 34. A first plane 72 (represented by a dashed line in FIG. 3) that is parallel to the leading edge 60 of the first wall 54 and located midway between the leading edges 60, 62 of the first and second walls 54, 56, respectively, extends laterally (e.g. perpendicular to the direction of gravity, or perpendicular to the downward direction) or within 45 degrees of laterally, and the utility void 52 can be said to face laterally inwardly (from within the rail 26 at the intermediate wall, out of the rail 26 through the opening 66).

An inner surface of the first wall 54 may define part of the utility void 52, and an outer surface of the first wall 54 may define the upper surface 38. The first wall 54 may be solid, or it may be at least partially hollow, and may include one or more ribs 74 extending from an outer portion defining the upper surface 36 to an inner portion defining the utility void 52. The second wall 56 may be spaced from the lower surface 40 of the utility rail 26 with an inner surface defining part of the utility void 52 and an outer surface defining part of one or more light voids 80 in which one or more lights 82 may be received. The second wall may be solid, or hollow and without or with ribs 83, as desired.

The lights 82 are carried by the utility rail 26, spaced and separate from the utility void 52. To illuminate an area outboard of the utility rail 26 and within the cargo area 12, the lights 82 include an emitter 84 from which light 82 is emitted from the light void 80(s). To facilitate illuminating more of the cargo area 12, in at least some implementations, multiple separate LED lights 82 are received within one or more light voids 80 in the utility rail 26. In the implementation shown, a single light void 80 extends longitudinally along at least a majority, and up to all, of the length of the utility rail 26, and multiple LED lights 82 are carried by the utility rail 26 within the light void 80. The lights 82 are longitudinally spaced apart, and are electrically coupled together and driven by a common electrical source.

The light void 80 may be a channel having an opening 86 through the lower surface 40 and extending between the inward and outward surfaces 34, 36. So arranged, the light void 80 is defined between opposed surfaces of first and second sidewalls 88, 90 and an end wall 92 extending between the sidewalls 88, 90, and which, as noted above, may be an outer surface of the second wall 56. The sidewalls 88, 90 may extend from spaced apart outer edges 94, 96, which may each be coincident with the lower surface 38 of the utility rail 26, to inner edge 98, 100 connected to the end wall 92. The sidewalls 88, 90 may be parallel to each other, if desired. Also, to retain the lights 82 in the light void 80 or for any other reason, the outer edges 94, 96 between which the opening 86 is defined, may be closer together than a portion of the sidewalls 88, 90 spaced from the outer edges. The lights 82 may also or instead be coupled to the rail 26 via fasteners that extend through the outward surface 36 of the utility rail body and which are connected to a housing 102 (FIG. 4) of the lights.

Figure 4:
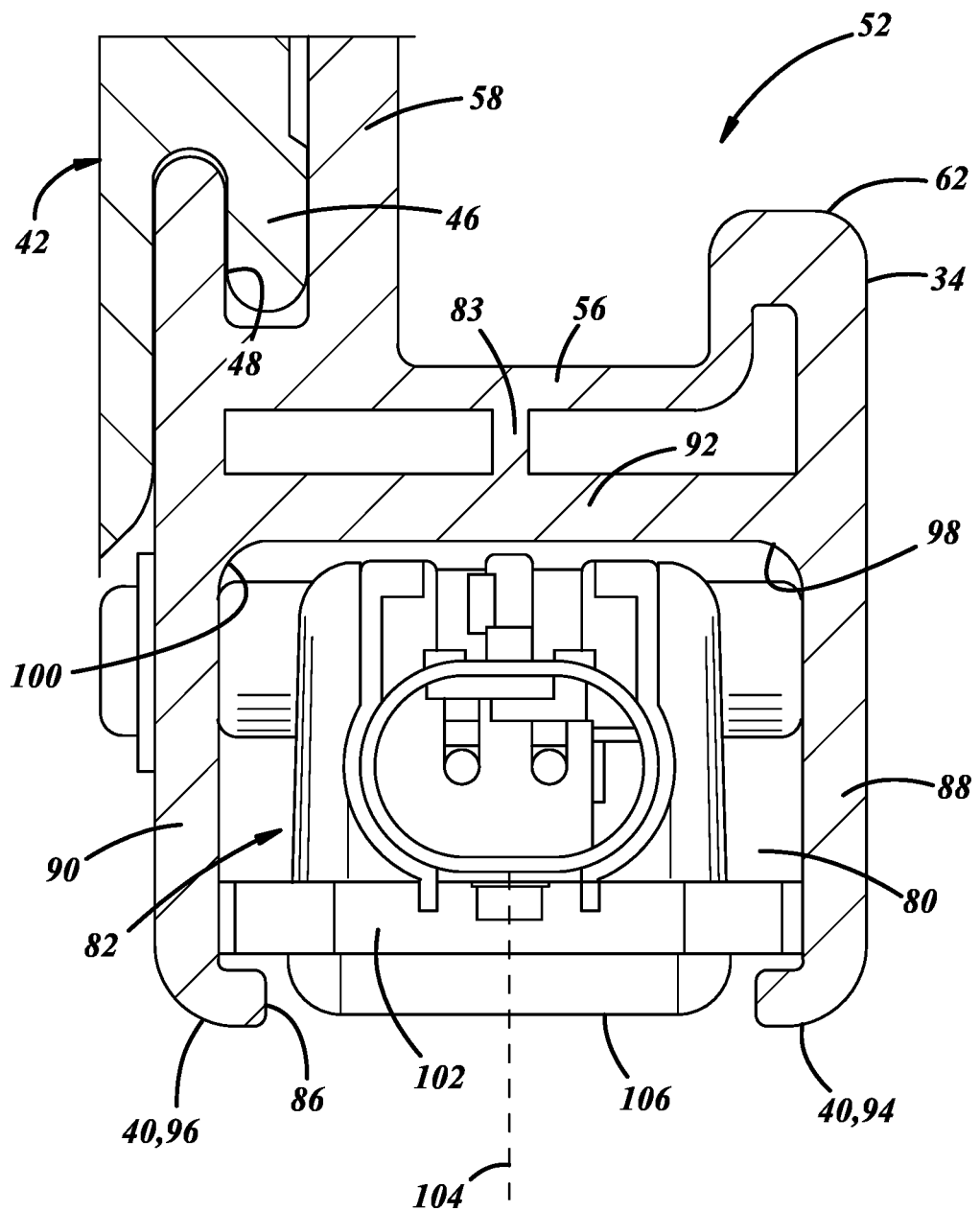
FIG. 4 is a cross-sectional view of the utility rail showing a light carried in a light void of the rail.

A second plane 104, represented by a dashed line in FIGS. 3 and 4, that is parallel to one or both sidewalls and located midway between the leading edges of the sidewalls 88, 90, respectively, extends vertically or within 45 degrees of vertically, and the light void 80 can be said to face vertically downwardly (from within the rail 26 at the end wall, looking out of the rail 26 through the opening). In this regard, the end wall 92 can also be said to face downwardly, that is, the surface defining part of the light void 80 extends longitudinally and laterally, and is oriented downwardly (opposed to something moving upwardly, against gravity). The light void 80 (and the second plane 104 defined therein) may face downwardly, that is, parallel to and in the direction of gravity or within 45 degrees thereof. Further, the lower edges 94, 96 of the inward and outward surfaces 34, 36 also can be said to face downwardly (opposed to something moving upwardly) and these edges and the end wall 92 may extend between the first end 30 and second end 32 of the utility rail 26. The light void 80 may extend along at least a majority of the longitudinal length of the downward facing surface(s) between the first end 30 and the second end 32 of the utility rail 26, and may extend along at least a majority of the length of the utility rail 26. In at least some implementations, the utility void 52 is oriented perpendicular or within 45 degrees of perpendicular to the light void 80. In the example shown, the utility void 52 is oriented (i.e. faces) laterally and the light void 80 is oriented (i.e. faces) vertically, as noted above. In this example, the light void 80 is below the utility void 52 with respect to gravity, although other arrangements may be utilized, as desired.

In at least some implementations, the light 82 is recessed within the body of the utility rail 26 such that no part of the light 82 extends outboard of an outer edge 94, 96 or outer surface 34, 36 of the body of the utility rail 26. In the example shown, the light 82 includes a lens or cover 106 exposed to the exterior of the utility rail 26 through or in the opening of the light void 80, and an outer surface of the lens or cover 106 is closer to the end wall 92 (and the upper surface 38 of the utility rail 26) than is the outer edge 94, 96 of the sidewalls 88, 90 or the lower surface 40 of the rail 26. So arranged, a rope or other component engaged with an exterior or outer surface of the rail 26 is less likely to engage the light 82 than if the light 82 protruded from the body of the utility rail 26, and the body may protect the light 82 from being damaged in use of the utility rail 26. The lens or cover may protect the inner components of the light 82, including the emitter, from contaminants like rain and dirt, and may direct light 82 in a desired direction, such as toward a middle of the cargo area. The downward facing light void 80 and sidewalls 88, 90 that define the void 80 may also shield the lights 82 from rain or other contaminants. Instead of being recessed, the lens or cover 106 may be flush with the outer edges 95, 96 of the sidewalls 88, 90 defining the light void 80 and/or extend outwardly therefrom and be durable enough to be engaged by a rope of other item in use and arranged to protect the interior light housing 102, emitter 84 and electrical components of the light 82. A single cover 106 could be provided along the full length or at least a majority of the length of the utility rail 26 and covering each of the lights 82 in the rail 26, if desired.

Figure 5:
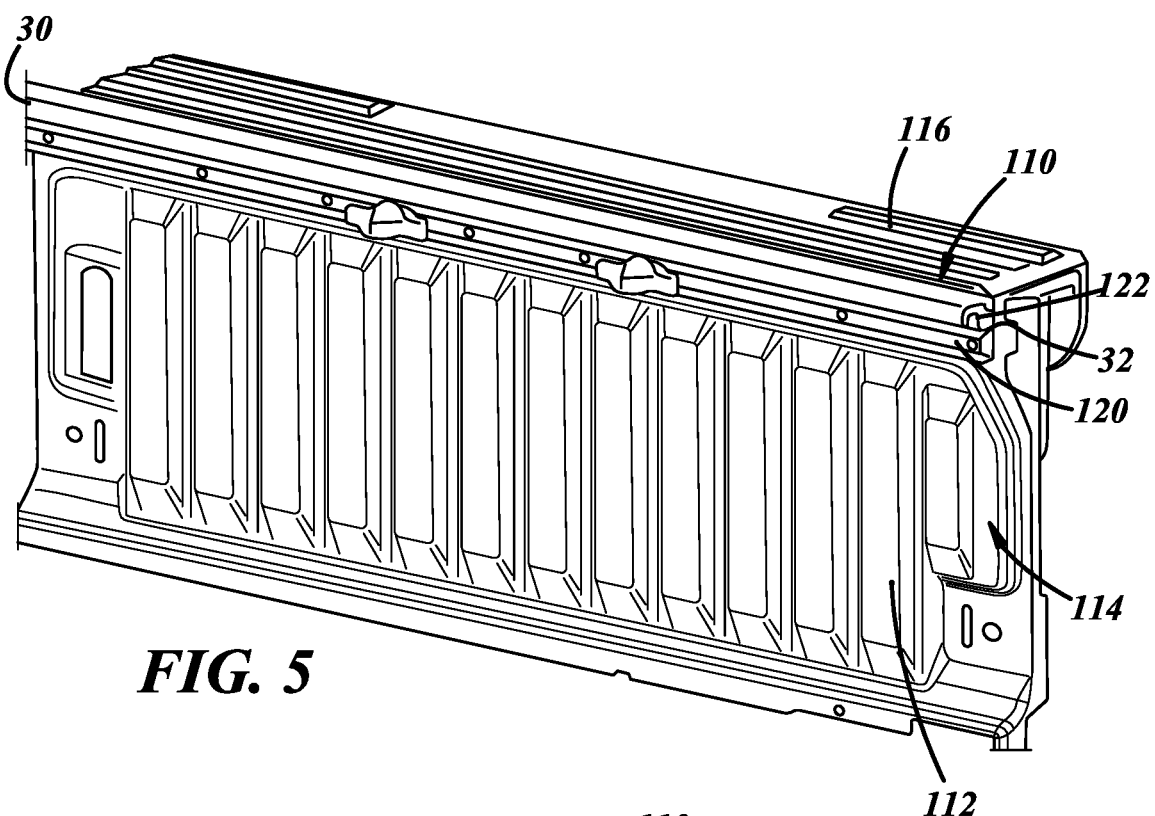
FIG. 5 is a perspective view of a sidewall of a pickup truck bed that is defined by a cargo compartment and which includes a utility rail.
Figure 6:
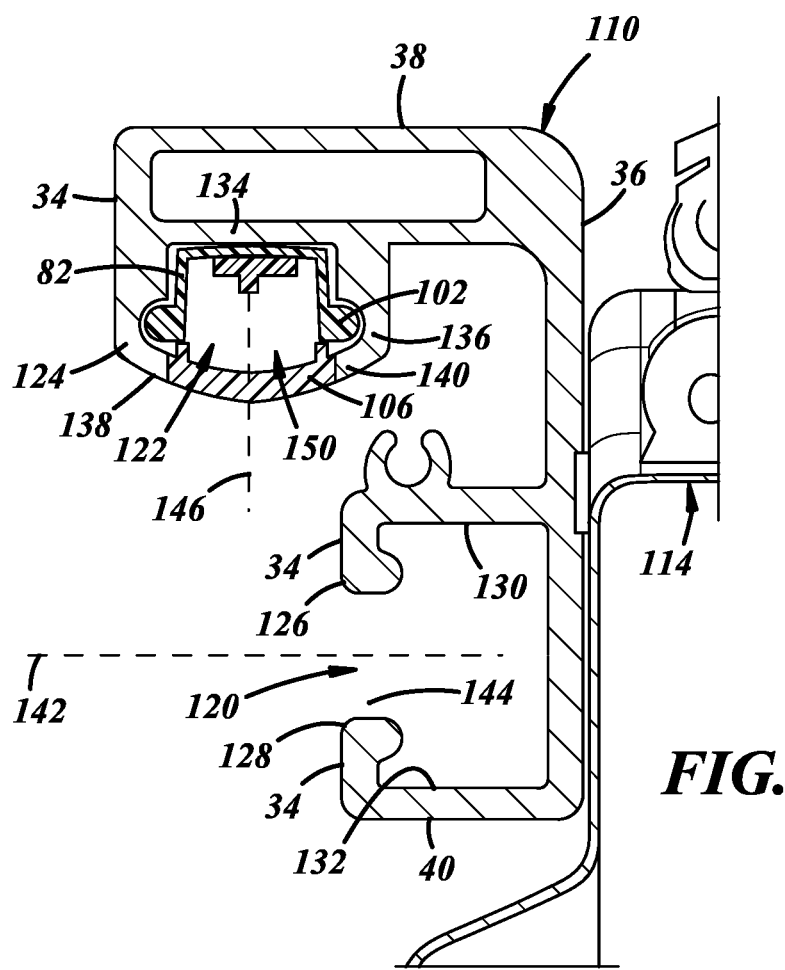
FIG. 6 is a cross-sectional view of the utility rail showing a light carried in a light void of the rail.

In the embodiment shown in FIGS. 5 and 6, the utility rail 110 is coupled to an inwardly facing sidewall 112 of a utility compartment 114 that is received within the cargo area 12 of the vehicle 10. The compartment 114 may have an upper surface 116 that defines a lid that is movable relative to a generally rectangular body in which things (e.g. tools) may be stored. The utility rail 110 may be connected directly to the sidewall 112 without a mount 42 or separate bracket, or a mount 42 may be used, if desired. The rail 110 may be formed similarly to the utility rail 26 described above with reference to FIGS. 1-3, and the same or similar features may be given the same reference numbers used with respect to utility rail 26 for ease of description and understanding of this utility rail 110.

The utility rail 110 has a first end 30, a second end 32, an inward surface 34 that extends between the first end 30 and the second end 32 and faces inwardly toward an interior of the cargo area 12, an outward surface 36 that faces toward the sidewall 112, an upper surface 38 that faces upwardly and a lower surface 40 that faces downwardly. The utility rail 110 has a longitudinal length defined between the first end 30 and the second end 32, a lateral width between the inward surface 34 and outward surface 36, and a height between the upper surface 38 and lower surface 40 in the vertical direction. In at least some implementations, the utility rail 110 is formed from a single piece of metal that is extruded, and the various features discussed herein may thus extend longitudinally, along the length of the utility rail 110. Of course, the utility rail 110 may be formed in other ways, and may be defined by more than one piece of material, as desired. A utility void 120 in utility rail 110 may be constructed and arranged in the same manner (bounded by similar walls/surfaces, having similar length, etc.) as set forth with respect to the utility void 52 of the first described utility rail 26. A light void 122 in utility rail 110 may be constructed and arranged in the same manner (bounded by similar walls/surfaces, having similar length, etc.) as set forth with respect to the light void 80 of the first described utility rail 26.

In this utility rail 110, the light void 122 is above the utility void 52 with respect to gravity. The inward surface 34 may thus be defined in part by a portion of the rail 110 that defines an inward wall 124 of the light void 80 and outer edges 126, 128 of the surfaces 130, 132 defining the utility void 52. The light void 122 may be defined between a downwardly facing surface of a base wall 134 (which could be the opposite side of the same wall that defines the upper surface 38), and inward and outward walls 124, 136 that extend to lower edges 138, 140 that are below the upper surface 38 of the utility rail 110 but above the utility void 120. Like the base wall 134, the lower edges 138, 140 may also be said to be downwardly facing surfaces, angled perpendicular to the force of gravity or within 45 degrees thereof. The lower surface 40 may be defined by a wall the inner surface 132 of which defines part of the utility void 120 such that the utility void 120 is at the bottom of this utility rail 110.

To facilitate directing light away from the walls/surfaces 130, 132 defining the utility void 120, the light void 122 may be at least partially inwardly offset from the utility void 120. That is, the inward wall 124 of the light void 122 may be offset inwardly (e.g. located farther from the outward surface 36 of the utility rail 110) from the outer edges 126, 128 of the walls 130, 132 of the utility void 120.

A first plane 142 (represented by a dashed line in FIG. 6) that is parallel to and midway between the surfaces 130, 132 and leading edges 126, 128 respectively, extends laterally (e.g. perpendicular to the direction of gravity, or perpendicular to the downward direction) or within 45 degrees of laterally. And the utility void 120 can be said to face laterally inwardly (from within the rail 110, looking out through the opening 144 of the utility void 120). A second plane 146, represented by a dashed line in FIG. 6, that is parallel to one or both sidewalls 124, 136 and located midway between the leading edges 138, 140 of the sidewalls 124, 136, respectively, extends vertically or within 45 degrees of vertically, and the light void 122 can be said to face vertically downwardly (from within the rail 110 at the end wall, looking out of the rail 110 through the opening 150 of the light void 122).

What is claimed is:

1. A utility rail for a vehicle, comprising:
   a body having a longitudinal length defined between a first end and a second end, a lateral width defined between an inward surface and an outward surface of the body, a utility void open through the inward surface, and a light void that is open to an exterior of the utility rail and that is separate from the utility void, the light void being defined between laterally spaced apart walls of the body and an end wall that extends between the laterally spaced apart walls, and the light void being located between the inward surface and the outward surface; and
   a light received in the light void and having an emitter from which light is emitted from the light void to illuminate an area adjacent to the utility rail.

2. The utility rail of claim 1 wherein the light is recessed within the light void such that no part of the light extends outboard of an outer edge of the utility rail that defines the light void.

3. The utility rail of claim 1 wherein the end wall is a downward facing surface and the light is arranged in the light void to emit light downwardly, where downwardly means in the direction of gravity or within 45 degrees of the direction of gravity.

4. The utility rail of claim 3 wherein the light void is defined in part by a lower edge of the inward surface and a lower edge of the outward surface, and at least one light void is provided between the inward surface and the outward surface.

5. The utility rail of claim 1 wherein the inward surface extends between the first end and the second end, and the utility void extends along at least a majority of a longitudinal length of the inward surface between the first end and the second end.

6. The utility rail of claim 1 wherein the utility void is a c-shaped channel, and the light void is a c-shaped channel that is oriented in a different direction than is the utility void.

7. The utility rail of claim 6 wherein the utility void is oriented perpendicular or within 45 degrees of perpendicular to the light void.

8. The utility rail of claim 1 wherein the utility rail includes one or more light voids and multiple lights are provided in the one or more light voids, and the multiple lights are electrically coupled together and are spaced apart along a length of the utility rail between a first end and a second end.

9. The utility rail of claim 1 wherein the body includes an upper surface provided between the inward surface and the outward surface, and the upper surface is opposite to a lower surface, and wherein multiple lights each include a lens having an outer surface that is closer to the upper surface than is a lower edge of the inward surface, where the lower edge of the inward surface defines part of the lower surface.

10. The utility rail of claim 8 wherein at least one of the multiple lights is connected to the utility rail by a fastener extending through the outward surface.

11. The utility rail of claim 1 wherein the light void is defined in part by a downward facing surface, and the downward facing surface extends between the first end and the second end, and the light void extends along at least a majority of a longitudinal length of the downward facing surface between the first end and the second end.

12. The utility rail of claim 1 wherein the end wall is below the utility void with respect to gravity.

13. The utility rail of claim 1 wherein the end wall is above the utility void with respect to gravity.

14. The utility rail of claim 1 wherein the body of the utility rail is formed in one-piece of a metal material.

15. A vehicle including a cargo area defined in part by a sidewall, comprising:
   a utility rail having a body formed from a single piece of metal, the body having an inward surface, a utility void open through the inward surface and defined between surfaces of a first wall of the body and a second wall of the body that is spaced from the first wall, an outward surface opposite to the inward surface, and a light void that is defined between surfaces of spaced apart walls of the body and an end wall of the body that extends between the spaced apart walls, and the light void being open to an exterior of the utility rail;
   a mount connected to the outward surface and to the sidewall to couple the utility rail to the sidewall; and
   a light received in the light void and having an emitter from which light is emitted from the light void.

16. The vehicle of claim 15 wherein the utility void and the light void are c-shaped channels.

17. The vehicle of claim 16 wherein the utility void is oriented perpendicular or within 45 degrees of perpendicular to the light void.

18. The vehicle of claim 17 wherein the light void is formed in a downwardly facing surface of the utility rail, where downwardly means in the direction of gravity or within 45 degrees of the direction of gravity.

19. The vehicle of claim 15 wherein multiple lights are received in the light void and are electrically coupled together.

20. The vehicle of claim 19 wherein the lights are recessed in the utility rail with an outer surface of the lights spaced inwardly from an outer surface of the utility rail that defines at least part of the light void.

* * * * *